United States Patent [19]

Sonnenberg

[11] Patent Number: 4,553,381
[45] Date of Patent: Nov. 19, 1985

[54] CUCUMBER HARVESTER

[76] Inventor: Bert Sonnenberg, R.R. #3, Waterford, Ontario, Canada, N0E 1Y0

[21] Appl. No.: 511,031

[22] Filed: Jul. 5, 1983

[30] Foreign Application Priority Data

Oct. 22, 1982 [CA] Canada .................................. 414012

[51] Int. Cl.⁴ ........................................... A01D 45/00
[52] U.S. Cl. .................................... 56/327 R; 56/14.2
[58] Field of Search ............ 56/327 A, 327 R, 328 R, 56/2, 14.1, 14.2, 16.3; 111/83, 73; 172/134, 26, 676, 156, 182, 183

[56] References Cited

U.S. PATENT DOCUMENTS

| 1,887,348 | 11/1932 | Freeman | 172/156 |
|---|---|---|---|
| 2,505,280 | 4/1950 | Ellinghuyen | 172/134 |
| 2,547,878 | 4/1951 | Marshall . | |
| 2,764,111 | 9/1956 | Collins | 111/73 |
| 2,829,484 | 4/1958 | Gilbert | 56/327 R |
| 2,893,193 | 7/1959 | Gilbert | 56/327 R |
| 2,916,868 | 12/1959 | Ramacher et al. . | |
| 2,930,436 | 3/1960 | Scheidenhelm . | |
| 3,084,496 | 4/1963 | Leonard et al. | 56/327 R |
| 3,386,236 | 6/1968 | Mitchell | 56/327 R |
| 3,427,794 | 2/1969 | Burton | 56/327 R |
| 3,581,484 | 6/1971 | Gilbert | 56/327 R |
| 3,600,882 | 8/1971 | Eisenberg | 56/327 R |
| 3,646,742 | 3/1972 | Krutson | 56/327 R |
| 3,667,200 | 6/1972 | Pool et al. . | |
| 3,690,383 | 9/1972 | Malley et al. | 56/327 R |
| 3,742,877 | 7/1973 | Coffee | 111/73 |
| 4,047,573 | 9/1977 | Aoyama | 56/327 R |
| 4,257,217 | 3/1981 | McClendow | 56/327 R |
| 4,261,163 | 4/1981 | Shaw | 56/327 R |
| 4,262,477 | 4/1981 | Tarold et al. | 56/327 R |

Primary Examiner—Gene Mancene
Assistant Examiner—John G. Weiss
Attorney, Agent, or Firm—Jones, Tullar & Cooper

[57] ABSTRACT

A method for harvesting cucumbers comprising forming a series of parallel trenches in a field while planting cucumber seeds in a line parallel to the trenches and spaced equidistantly from adjacent trenches, the trenches being spaced apart a distance equal to the track of a tractor to be used for harvesting the cucumbers, and when the cucumbers have grown to maturity, harvesting the cucumbers with a harvester having spaced apart cucumber pick-up heads which are guided along either side of a row of cucumber vines while mounted on a tractor whose wheels are being guided by the parallel trenches.

1 Claim, 18 Drawing Figures

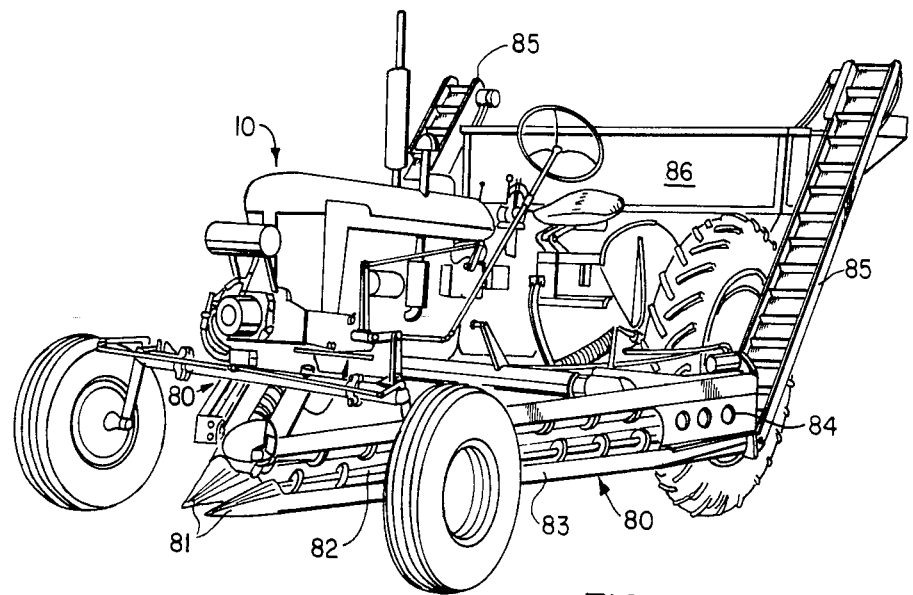
FIG. 5
FIG. 6
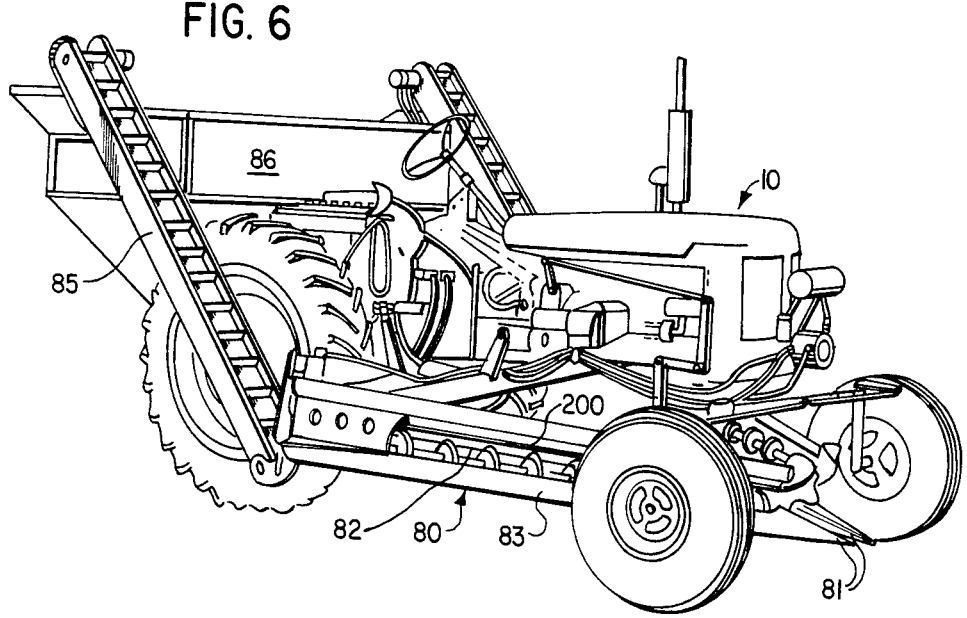

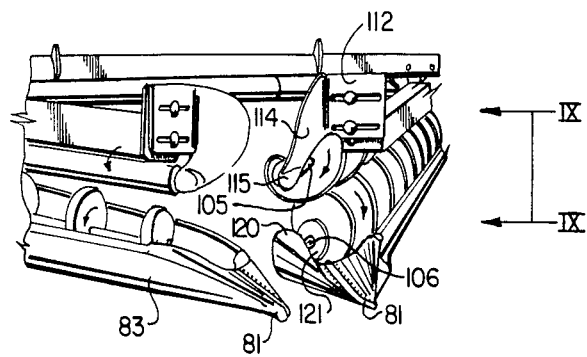
FIG. 7
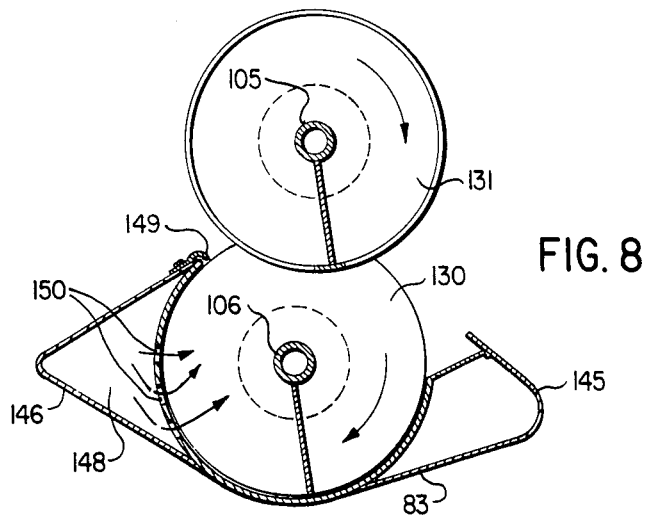
FIG. 8
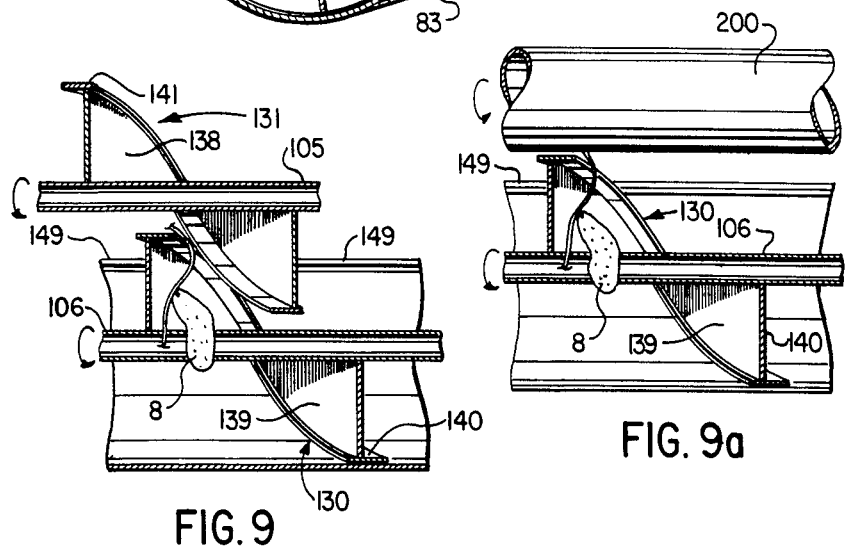
FIG. 9
FIG. 9a

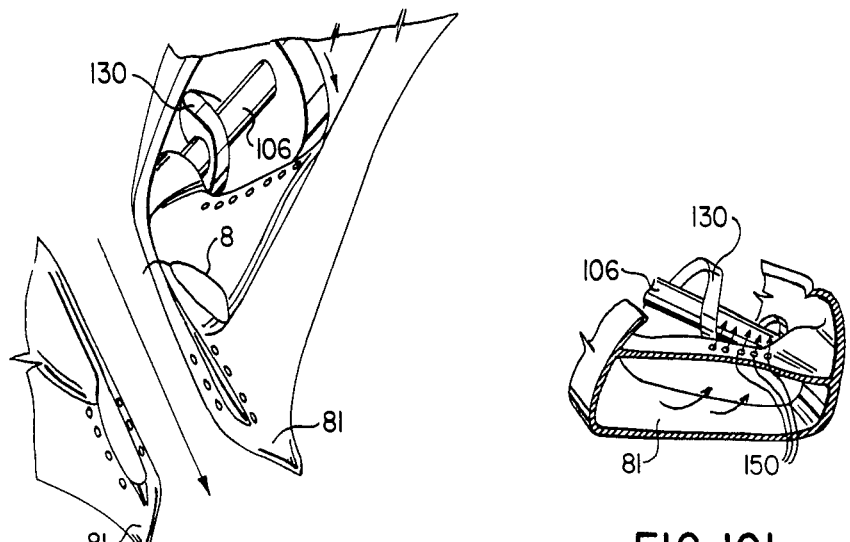
FIG. 10a
FIG. 10b
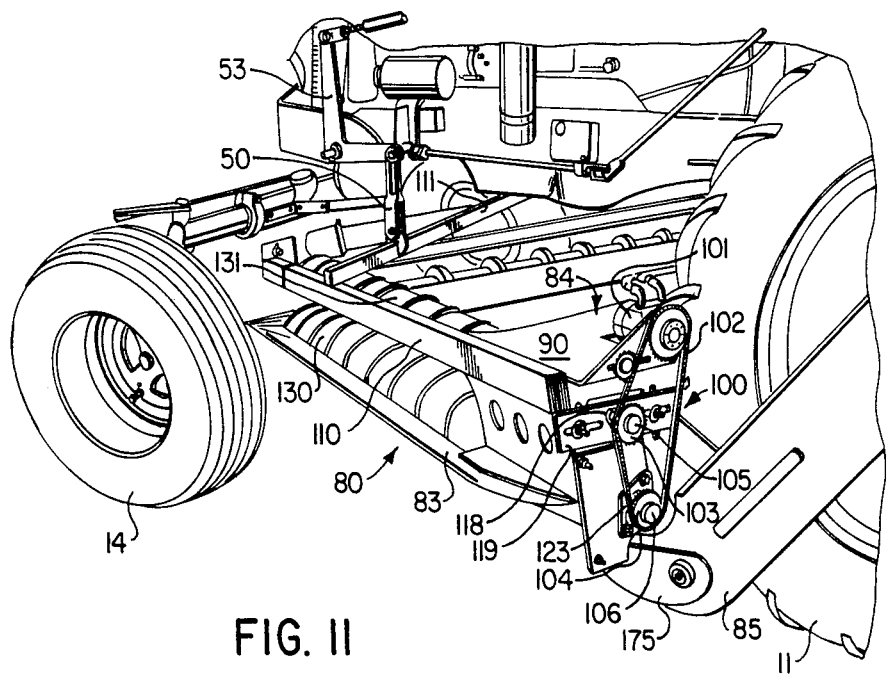
FIG. 11

CUCUMBER HARVESTER

This invention relates to a method and apparatus for the mechanical harvesting of cucumbers.

BACKGROUND OF THE INVENTION

Mechanical cucumber harvesters are known. Some are disclosed in U.S. Pat. Nos. 2,841,947, 3,347,031, 3,365,869, 3,386,236, 3,427,794, 3,600,882, and 3,603,067. In general these patents disclose cucumber harvesters for the mechanical picking of cucumbers which employ picking rolls, snap rolls, resilient and hard rolls, and picking rollers in various combinations for the purpose of removing cucumbers from vines which in some of the disclosed apparatus are cut from the roots, whereas in some of the other disclosed apparatus they are not cut from the roots.

Specifically, and by way of example, there is utilized in U.S. Pat. No. 3,603,067 an arrangement in which the vines are cut and snap rolls are used in conjunction with a roller for removing the cucumbers from the vines.

U.S. Pat. No. 3,600,882 discloses a cucumber harvester of the type in which the vines are not cut. In this patent there is disclosed the use of a plurality of resilient rollers to engage and lift the vines from the ground, the resilient rollers being very soft to avoid damaging the vines so that after the cucumbers have been picked from them, the vines can be left to grow and bear additional cucumbers.

Also of interest is U.S. Pat. No. 2,841,947 which relates to a cucumber harvesting machine including vine lifting and picking mechanisms which comprise a cluster of rolls or roll guided elements such as belts. Again soft rolls are used to achieve the desired result.

U.S. Pat. No. 3,347,031 is an example of a harvester which utilizes belts and rollers for separation of cucumbers from the vines and U.S. Pat. No. 3,365,869 is an example of a cucumber harvester which employs fingers to hold the vines in position while cucumbers are knocked from the vines.

U.S. Pat. No. 3,386,236 depicts a tractor mounted cucumber harvester which utilizes rollers to remove the cucumbers.

Insofar as is known, one of the most successful harvesters is that depicted in U.S. Pat. No. 3,603,067. This known apparatus has the inherent disadvantage of utilizing only "once-over" harvesting inasmuch as the apparatus requires that the vines be severed from the roots in order to harvest the cucumbers from the vines. Furthermore, substantial experience with this known apparatus indicates that it greatest efficiency is achieved in the harvesting of large sized cucumbers from vines with the disadvantage of this apparatus being that smaller cucumbers tend to pass through the rolls with the vines to be crushed and rendered useless.

It will be appreciated that it is advantageous not to destroy the vines during harvesting because of the low return achieved on once-over harvesting. Furthermore it would be advantageous to have a mechanical cucumber harvester capable of picking the size ranges required by processors. Obviously, some processors require large sized cucumbers whereas other processors, such as picklers, require relatively small sized cucumbers. It is also believed obvious that if the vines are left on the ground relatively undamaged and without being severed from their roots, after being first harvested, they will be capable of growing additional cucumbers which can be harvested in a few days, depending on weather conditions.

There thus remains a need for a method and apparatus for harvesting cucumbers which does not sever the vines from the roots, which is capable of harvesting the full range of sizes of cucumbers required by processors, which can be manufactured at reasonable cost so as to be affordable to the modest grower, and which can be tractor mounted so that it does not require its own prime mover thereby substantially reducing the cost of the harvester.

The method and apparatus of the present invention is believed to meet these requirements through the provision of a tractor mounted cucumber harvester which utilizes either a pair of co-operating, parallel augers, or a parallel auger and kink roil, to pick up the vines, remove from them cucumbers of various sizes and then relay the vines on the ground without any significant damage having occurred to the vines thereby enabling them to continue their production of cucumbers for further, subsequent harvesting. Although complicated, this harvester has a built in durability that requires little maintenance by a concept utilizing a minimum number of moving parts. It also will work well in wet weather because the tractor wheels can have ruts to follow on a relatively solid base, (a very important point as cucumbers grow faster with alot of moisture and a crop must be kept up if it is to be profitable). It will also work under weedy conditions. Another advantage of planting using this method is known as "bedding" and is catching on very quickly in cucumber growing areas where the soil is on the heavy side such as clay and clay looms.

Harvesting machines employing augers of various sorts, are known for harvesting such vegetables as sugar beets (U.S. Pat. No. 2,547,878), nuts (U.S. Pat. No. 2,916,868), vine crops (U.S. Pat. No. 2,930,436), and fruit and nuts (U.S. Pat. No. 3,667,200).

SUMMARY OF THE INVENTION

The present invention, in a few words, provides a method and apparatus for the harvesting of cucumbers. In the spring, when seeding a field with cucumber seeds utilizing a tractor mounted cucumber seeder, the tractor is provided with a pair of trenchers, one being located directly behind each of the front wheels of the tractor, the front wheels having the same track as the rear wheels. The trenchers are vertically adjustable utilizing hydraulic controls provided on the tractor, and dig trenches in the soil of approximately 5 inches deep which trenches serve to guide the tractor during the subsequent cucumber harvesting. When it is time to harvest cucumbers, the vertically adjustable trenchers and seeder are replaced by the cucumber pickers of the invention either in the form of a main and top auger or in the form of a main auger and snap roll, the pickers being arranged on the tractor so that the front ends of the pickers are adjustable vertically so that the picker heads go under the vines and pick them up, and the pickers remove the cucumbers from the vines, and relay the vines back down on the ground. The pickers convey the picked cucumbers to the rear of the pickers where they are fed onto conveyers which carry the cucumbers up into a cucumber storage bin mounted on the back of the tractor. The operation of the picker is aided by air jets provided along the picker and at the picking head, at strategic locations.

More specifically, the present invention provides a method for harvesting cucumbers comprising forming a series of parallel trenches in a field while planting cucumber seeds in a line parallel to the trenches and spaced equidistantly from adjacent trenches, the trenches being spaced apart a distance equal to the track of a tractor to be used for harvesting the cucumbers, and when the cucumbers have grown to maturity, harvesting the cucumber with a harvester having spaced apart cucumber pick-up heads which are guided along either side of a row of cucumber vines while mounted on a tractor whose wheels are being guided by the parallel trenches.

The invention also provides a trenching and seeding apparatus comprising a tractor mounted, vertically adjustable trencher located behind the front wheel of the tractor, the trencher having a pair of parallel, trench side wall cutting disks behind which is located an earth scoop located to feed earth cut by the disks from the trench to an impeller located at the rearward end of the scoop, the impeller being rotatable to throw dirt from the rear end of the scoop to the side of the trench.

In addition, in a broad sense, the present invention also provides a cucumber harvester adapted to be mounted on a tractor and comprising a pair of cooperating shaped, spaced apart conical cucumber vine pick-up heads, a pair of pickers, the front end of each picker being secured to a respective pick-up head, the pickers diverging rearwardly from the vine pick-up heads to respective picker support and drive mechanisms, each picker having a rotatable main auger and a rotatable top member cooperable with the lower main auger to pick cucumbers from vines without removing the vines from the earth, a trough extending along the bottom of the main auger to catch and retain cucumbers while they are being transported to the rear ends of the respective pickers by the main augers, means to rotate the augers and cooperating members, means for vertically adjusting the vine pick-up heads and cucumber conveying mechanism for removing the cucumbers from the rear ends of the troughs.

BRIEF DESCRIPTION OF DRAWINGS

FIG. 5 is a perspective view of the front-end of the tractor having the cucumber harvesting apparatus of the present invention mounted on it and showing that embodiment of the picker utilizing a pair of augers, a main auger and a top auger;

FIG. 6 is a perspective view of the opposite side of the apparatus of FIG. 5, showing another embodiment of picker in the form of a main auger and a top snap roll;

FIG. 7 is a perspective view, with parts removed, of the shaped pick-up heads and respective pickers shown in FIGS. 5 and 6;

FIGS. 8 and 9 respectively are partly sectioned views with parts broken away of the main and top augers seen in FIG. 7;

FIG. 9a is a partly sectioned view with parts broken away of the main auger and top snap roll seen in FIG. 7;

FIGS. 10a and 10b are details with parts broken away of the pick-up heads of FIG. 7, and air plenum, utilized in the pick up heads;

FIG. 11 is another view of the tractor of FIG. 5 showing the mounting and drive arrangements for the picker utilizing dual augers;

DESCRIPTION OF PREFERRED EMBODIMENTS

The invention consists of a tractor mounted trenching apparatus, a tractor mounted cucumber picking apparatus, and a method of using the trenching and picking apparatus to plant and harvest cucumbers 8. Each will be described in turn.

TRENCHING APPARATUS

Figure 1:
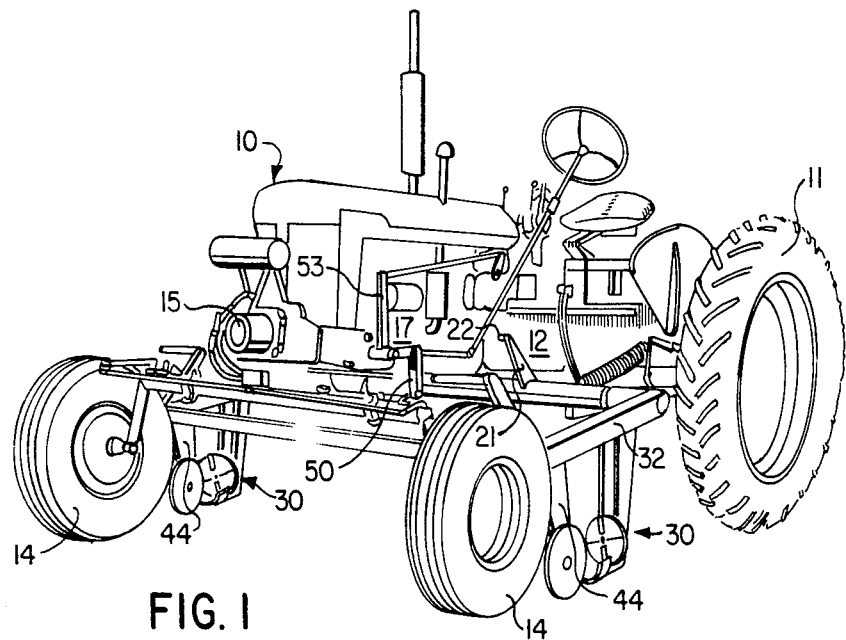
FIG. 1 is a perspective view of a tractor with trenchers of the present invention mounted on it.
Figure 2:
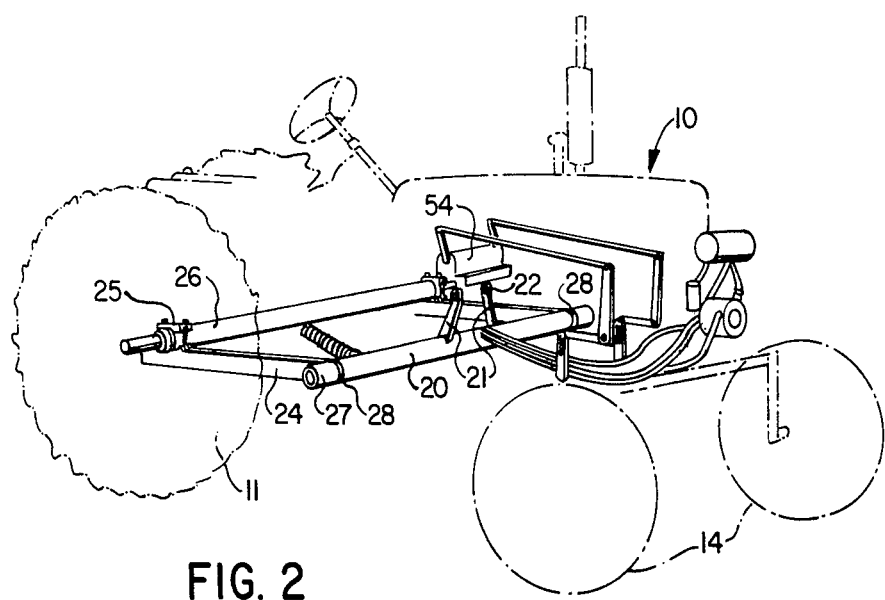
FIG. 2 is a phantom view of the tractor of FIG. 1 with the trenching apparatus removed, and showing mounted on the tractor, a hydraulically actuated frame for mounting the trenchers and the harvester of the present invention.
Figure 4:
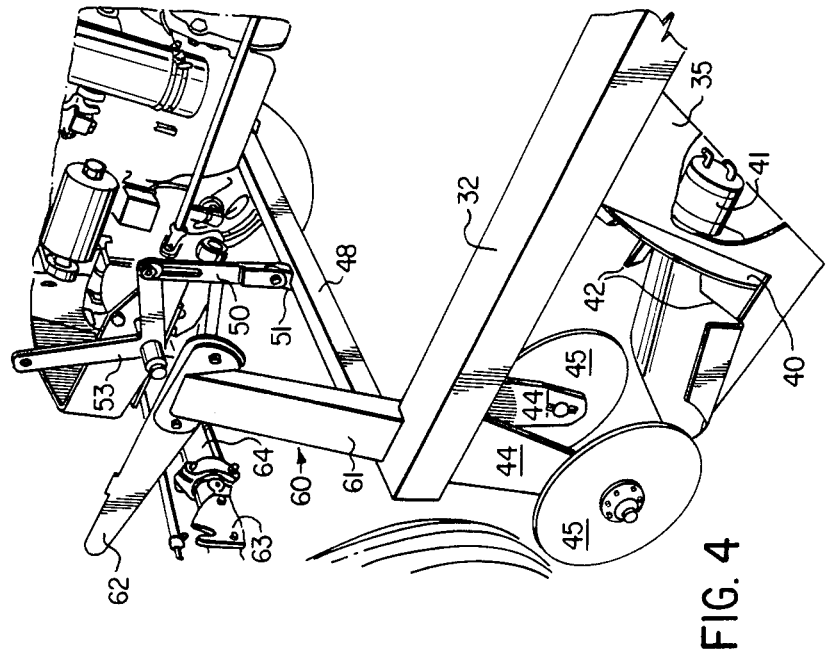
FIG. 4 is a perspective view in detail of one of the trenchers with the trenching apparatus mounted on the tractor.
Figure 3:
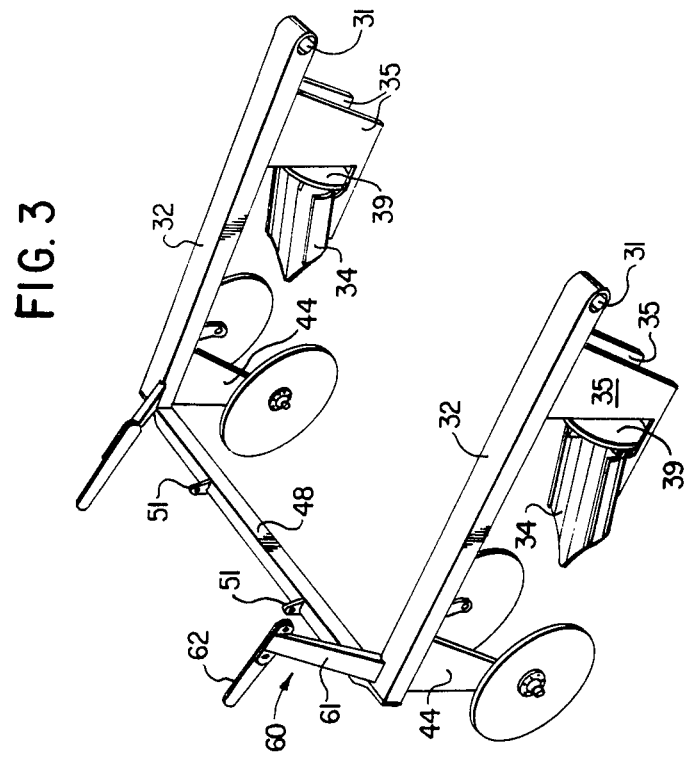
FIG. 3 is a perspective view of the trenching apparatus removed from the tractor.

Reference is made to FIGS. 1 to 4 inclusive. With particular reference to FIG. 2, there is shown a conventional tractor 10 provided with a pair of conventional rear drive wheels 11, a frame 12 and a pair of front, steering wheels 14. The tractor is also provided with a front mounted hydraulic pump 15 driven off the front-end power take-off of the tractors engine 17. The track of the front wheels of the tractor is the same as that of the rear, and the tires on the front wheels are approximately of the same width, or less, than that of the rear tires.

Beneath the frame 12 of the tractor and approximately mid-way along its length is a transversely mounted, tubular member 20, secured to the tractor's frame by brackets 21 bolted to the frame at 22, and by rearwardly extending arms 24 which arms pass under, and are secured to the tractor's rear axle 26, by "U" bolts 25.

Located within tube 20 is a pivot tube 27 (see also FIG. 12) which extends through and beyond both ends of tube 20 and is pivotable within tube 20 on bushing 28. A pair of trenchers 30 are fixed on respective ends of the pivot tube 27, each trencher 30, including socket 31 (FIG. 3) which fits over tube 27. An arm 32 is welded to socket 31, the arm 32 being of rectangular cross-section. Depending from each arm 32 just ahead of its socket 31 is a scoop 34, attached to a pair of parallel, L-shaped brackets 35 which are in turn secured to the arm 32. Each pair of L-shaped brackets has attached between them to their vertical arms (see FIG. 4), an hydraulically operated impeller 39 consisting of a disc 40, driven by a hydraulic motor 41, and provided with four radially extending blades 42 arranged to pick up and throw to one side, earth picked up by the scoop 34. In front of each scoop 34 and located by arms 44 depending from the front end of the main arm 32 is a pair of vertically oriented, parallel, rotatable discs 45 which can be adjusted vertically to cut the vertical sides of the trench to be cleared out by the following scoop 34 and impeller 39.

A rectangular sectioned cross bar 48 is pivotally mounted at each of its ends to the respective front, free ends of the arms 32. This cross bar 48 is in turn linked through linkage 50 extending from pivot points 51 to tractor mounted bell cranks 53, actuatable by the tractor's hydraulic system 54 (FIG. 2) to permit vertical movement of the trenchers, the lowermost position of each of the trenchers being controlled by a depth guage 60 (FIGS. 3 and 4) consisting of an arm 61 extending upwardly from the free end of each of the arms 32, to the upper end of which arm 61 there is attached a blade 62 adapted to cooperate with a slotted plate 63 fixed to the tractor's front axle 64, the blade dropping into the slot in the plate to limit the vertical downward movement of the trenchers 30 and discs 45 which would otherwise be free to move upwardly and sideways to a degree which would render the trencher inoperative. The hydraulic controls are used to continually urge the trenchers to their lowermost predetermined position.

The hydraulic motors 41 driving each of the impellers are driven by the hydraulic pump 15 in a conventional manner.

CUCUMBER PICKING APPARATUS

The cucumber picking apparatus 80 (FIG. 5) is mounted under the tractor 10 utilizing the same mounting apparatus (FIG. 2) as is used by the trenchers 30. That is, the rear ends of the picking apparatus 80 are secured to respective ends of the pivot tube 27 and the front ends of the picking apparatus 80 are secured to linkage 50 to permit vertical movement of the front ends of the picking apparatus. The picking apparatus 80 includes, from front to rear, specially shaped, conical cucumber vine pick-up heads 81, pickers 82 which remove the cucumbers from the vines, a trough 83 extending along the bottom of the pickers 82 from the heads 81 to the rear end of the pickers 82, a generally boxed shaped picker frame 84 and located to the rear of the trough 83 and mounted on the picker frame 84, a pair of conveyers 85 for transporting cucumbers from the end of trough 83 into a storage bin 86.

Figure 12:
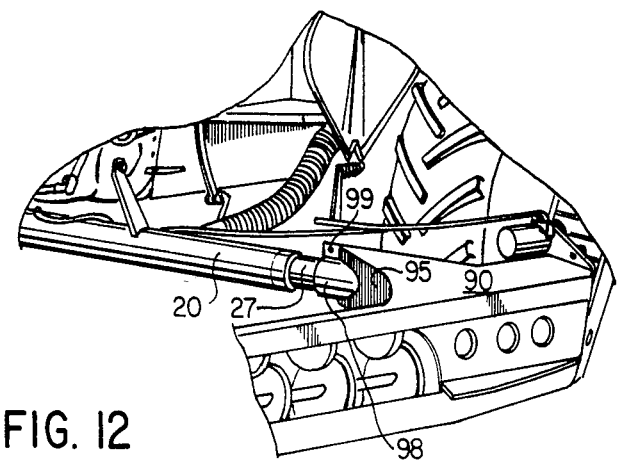
FIG. 12 shows in detail, with parts broken away, the mounting arrangement for the rear ends of the augers shown in FIG. 11.

The entire picking apparatus which includes two set of pickers 82 extending generally horizontally and rearwardly in a diverging V-shape under the tractor, are supported essentially by the picker frames 84 one of which is clearly shown in each of FIGS. 5, 6 and 11 to 14 to which reference will now be made. The picker frame 84, at its rear end can best be described as being in the form of an irregularly shaped box section. The box section includes a top wall 90, the shape of which is best seen in FIG. 12, and an outside wall 91. There is also a partial rear wall 93 shown in FIG. 14 as is bottom wall 94 and a front wall 95 (FIG. 12).

As seen in FIG. 12, extending inwardly from between the front and rear walls 95 and 93 is a tubular member 98 (FIG. 12) constructed to permit the securing of the picker frame 84 to the free end of the pivot tube 27 through the use of a clamping and telescopic adjustment of the picker frame to tube 27.

Figure 14:
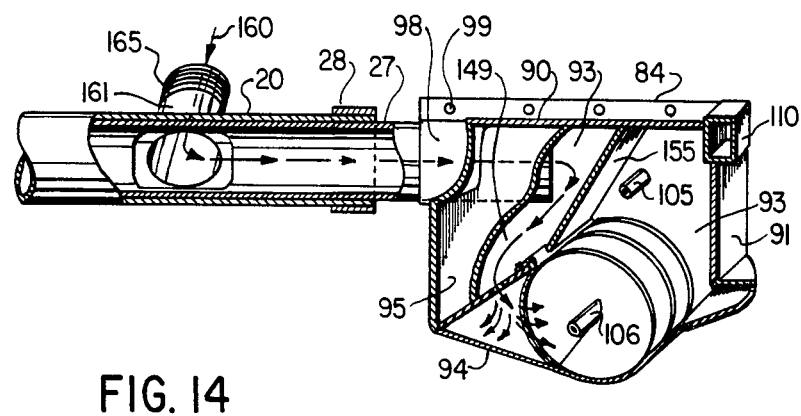

Located behind the rear wall 93 is the picker drive mechanism 100 (FIG. 11) which includes a hydraulic motor 101 driving a chain 102 which in turn drives through sprockets 103 and 104, picker shafts 105 and 106 respectively which shafts also appear in FIG. 14. Hydraulic motor 90 is driven by the hydraulic pump 15 in a conventional known manner.

Extending forwardly from the picker frame is an upper square tube member 110 and a lower trough 83 (FIGS. 11, 12 and 14). Located at the front end of the square tube member 110 is a bearing support plate 112 (see FIG. 7) which plate is horizontally and vertically adjustable relative to the tractor and has secured to it a depending arm 114 to the lower end of which is attached a bearing 115 which supports the front end of the shaft 105, the rear end of which is supported in a bearing 118 mounted on a plate 119 which is adjustable in a horizontal and vertical direction relative to the picker frame 84 (see FIG. 11). A cross bar 111 extends between each of members 110, the cross bar interconnecting the front end of the pickers 82 to the linkage 50.

Located at the forward end of the trough 83 is a pick-up head 81 which is hollow and shaped as best shown in FIGS. 7 and 10a and which head 81 includes a flange 120 to which is secured a bearing 121 in which is mounted the forward end of shaft 106, the rear end of which is mounted in the bearing block 123 (FIG. 11).

Mounted on shafts 106 and 105 respectively are a main auger 130 and a top auger 131. Each of the augers include the tubular shafts 106 and 105 to which are welded sheet steel flights 138 and 139 (FIG. 9) with each flight extending continuously from front to rear and with each flight having the same pitch. Each flight is tapered from its front end where it has a diameter of 5" to about $\frac{1}{3}$ of the distance along its length where the diameter is 8" from where the diameter remains constant to its rear end.

As shown in FIG. 9 each of the flights 138 and 139 has welded along its outer edge for a distance extending from the front end of the auger to about two-thirds of the way along the auger towards its rear end, strips of metal 140 and 141. On the main lower auger 130 the strip 140 is relatively about 1" in width and is offset so that the flight and strip form an L-shape, with the strip 140 projecting towards the rear end of the auger 130. The strip 141 on the top auger 131 is wider, about 2" in width and is welded to the flight to form a T-shape with one arm of the T being much longer than the other, the longer arm extending towards the front end of the auger 131. The flights on each auger 130 and 131, are arranged through their chain drive to travel at the same speed and together when rotated at about 100 rmp which is variable to achieve effective picking. The tops of the auger rotate to the outside of the pickers, that is away from the vine being picked, as shown by arrows in FIGS. 8 and 9.

As best seen in cross section in FIG. 8, the trough 84 includes an outer generally U-shaped guard 145 which extends along the outside of the trough 84 from front to rear and also includes a vine deflector 146 which extends along the trough 84 from the pick-up head 81 at the front end of the trough to the picker frame 84 at the rear end of the trough. The deflector 146 forms, in conjunction with a portion of the trough 84, an air conduit 148.

Attached to the upper edge of the V-shaped vine deflector 146 is a scraper 149 which extends entirely along the upper edge of the deflector and aids in removing cucumbers 8 from vines.

The air conduit 148 communicates at its front end with the hollow pick-up heads 81 which, as shown in FIGS. 10a and 10b in particular are provided with about $8\frac{1}{4}$" air holes 150 which are positioned and shaped to aid in removing debris from the pick-up heads while at the same time preventing the leaves from tangling in the augers, and directing the cucumbers and vines into the pickers 82. The pick-up heads 81 must be shaped to pick up vines and cucumbers and feed the cucumbers between the augers. The shape is generally conical with the upper wall portion of the cone indented as seen in FIG. 7.

The rear end of the air conduit 148 communicates, as best shown in FIG. 14, with an air box 149 formed within the picker frame 84 using a partition plate 155 which prevents air from escaping out of the bottom and rear of the frame 84 except for air released into this area in a controlled manner to aid in the operation of the picker. This air is released in the main from about 70, $\frac{1}{4}''$ diameter air holes 150 extending along the full length of the auger 130, these air holes being seen in FIG. 8.

Figure 13:
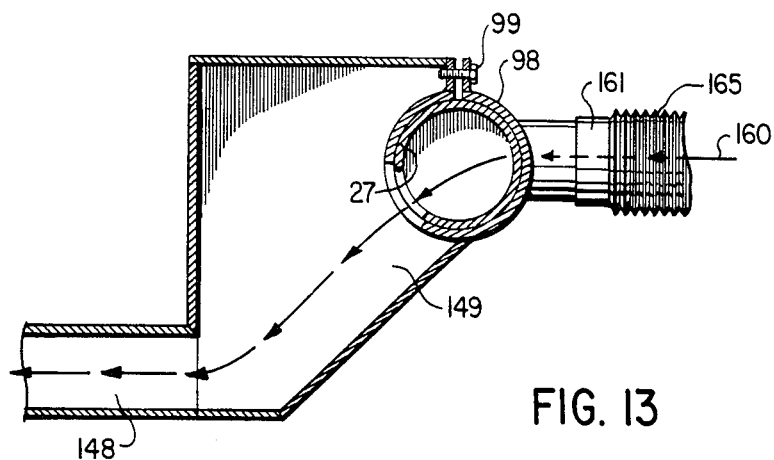
FIGS. 13 and 14 are partly sectioned views showing details of the air supply systems.

The air-flow into the air box in picker frame 84 defined in part by the partition 155 follows the direction of the arrows 160 that is through a nipple 161, through the tube 20, a corresponding aperture in the pivot tube 27 and out of the end of the pivot tube 27 into the air box within the picker frame 84 and thence into the air conduit 148 and along to the pick-up head 81 as shown in FIG. 13.

Figure 15:
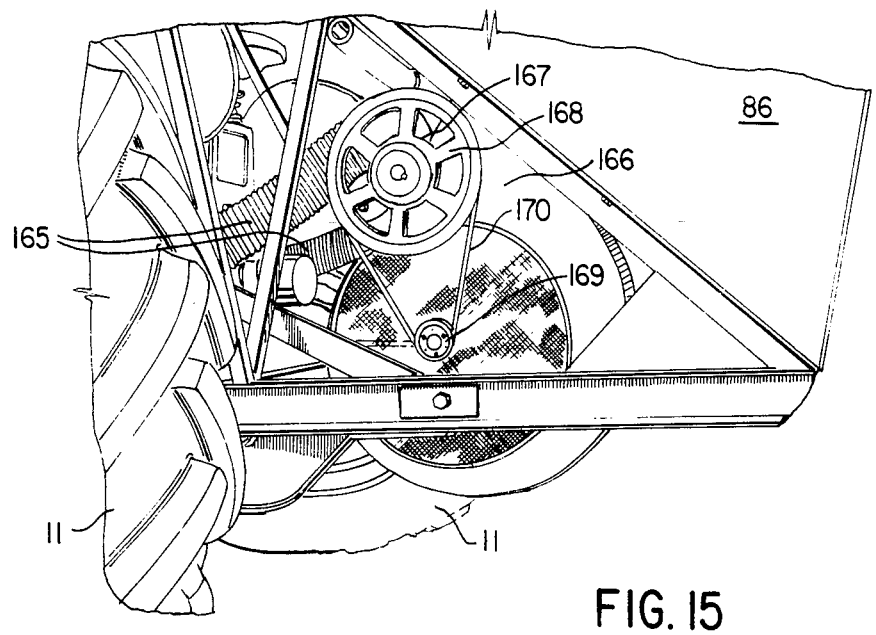
FIG. 15 is a perspective view, with parts broken away, of the source of the low pressure air provided to the pickers.

Low pressure air is provided to the nipple 161 through flexible conduits 165 which extend back to a low pressure centrifugal blower 166 located under the bin 86 at the rear of the tractor as shown in FIG. 15. The low pressure blower is driven by a hydraulic motor 167 connected to a V-belt pulley 168 which in turn is connected to a V-belt pulley 169 through a V-belt 170, pulley 169 driving the shaft of the centrifugal blower 166. The alternative picker 82 shown in FIG. 6 is the same as the other picker in all respects except for the replacement of the top auger 131 with a top snap-roll 200 in the form of a roller having a constant diameter of $3\frac{1}{4}''$ from end to end and a smooth chrome finish to let vines slide toward the rear as moved by the auger. This roll 200 is mounted and driven exactly as the top auger 131. The front end of the snap-roll is rounded off to form a bullet shape that blends into the front bearing retainer. FIG. 9a shows the relationship between the main auger 130 and the top, snap-roll 200 as well as their direction of rotation.

While two differents types of pickers are shown, one a double auger arrangement and the other a lower auger and snap-roll arrangement, it will be more common to have both pickers the same in any single apparatus. The two different types of pickers are shown on one harvester for convenience of explanation.

THE CONVEYORS AND STORAGE BIN

Figure 16:
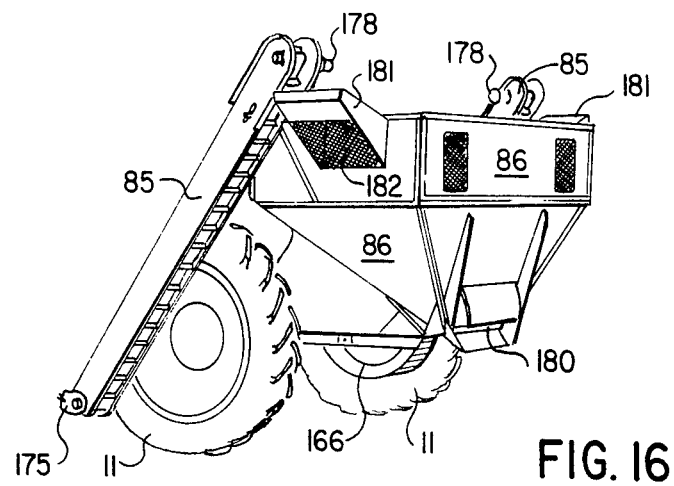
FIG. 16 is a perspective view with parts broken away, of the cucumber conveyers and storage bin mounted on the back of the tractor of FIG. 5.

As best seen in FIG. 11, each of the conveyors 85 has its bottom end pivotally mounted to a bracket 175 secured to the bottom of the picker frame 84 with the upper ends of the conveyors 85 being secured to the bin 86, along its respective sides (see FIG. 16) with each of the conveyors 85 being driven by conventional hydraulic motors 178, driven from the hydraulic pump 15 in a conventional manner, the conveyors also being conventional and known and therefore not requiring any further description.

The cucumber bin 86 is of generally conventional construction, has a hopper shape, and includes an outlet 180 provided with a manually operable gate (not shown). Chutes 181 provided with screened bottoms 182 extend outwardly from the sides of the bin to collect cucumbers discharged from the upper end of the conveyor 85, the screen in the bottom permitting dirt to fall away from the cucumbers before the cucumbers flow into the bin.

OPERATION

In the spring when it is time to plant cucumber seeds, a conventional known cucumber seeder is attached to the rear of the tractor and the trenchers are attached to the tractor as described. At the same time that the cucumber seeds are being planted, the trenchers operate as described, being set in their lowermost operative position to cut trenches in the field approximately 5 inches deep and as wide as the widest tractor wheel. The cucumber seeds are planted in a row located midway between the trenchers. The result is a cucumber field having parallel trenches alternating with equally spaced rows of cucumber seeds which ultimately grow into vines which bear cucumbers.

When it is time to pick the cucumbers from the vines the trencher and planter are replaced with the picker as already described, the tractor wheels are placed in the previously formed trenches and serve to guide the tractor during picking, the pick-up heads are lowered to just above the ground. The augers are rotated in the direction depicted in FIGS. 7 and 8 at a speed of about 100 r.p.m. or a speed that corresponds to the ground speed and the pick-up heads are moved forwardly under the cucumber vines and the vines and cucumbers are thereby fed between the augers or snap roll and auger as the case might be. The strips 140 and 141 (FIG. 9) effectively cut most sizes of cucumbers from the vines and as the tractor proceeds in a forward direction the vines are withdrawn from the augers and lie back down in the field without being fatally damaged. The picked cucumbers fall into the trough 83 and are moved rearwardly by the main auger to be discharged from the rear end of the picker frame 84, picked up by the conveyor 85 and delivered into the bin 86. In this way the vines are left in the field to grow more cucumbers which can again be picked in the same manner after an appropriate time interval, usually of a few days. That picker utilizing a snap roll simply snaps the cucumbers 8 from the vines due to its rotation and consequent pull exerted on the cucumbers.

The embodiments of the invention in which an exclusive property or privilege is claimed are defined as follows:

1. A cucumber harvester adapted to be mounted on a tractor, comprising:
   a pair of cooperatively shaped, spaced apart conical cucumber vine pick-up heads;
   a pair of picker support and drive mechanisms;
   a pair of pickers, the front end of each picker being secured to a respective pick-up head, said pickers diverging rearwardly from said pick-up heads to respective picker support and drive mechanisms, each said picker having a rotatable lower main auger and a rotatable top member cooperable with said main auger to pick cucumbers from vines without removing the vines from the earth, and having a trough extending along the bottom of said main auger to catch and retain cucumbers picked from vines, rotation of said main auger transporting cucumbers along said trough toward the rearward end of said picker;
   means including said support and drive mechanisms for rotating said main augers and said cooperating members;
   means for vertically adjusting said vine pick-up heads; and
   cucumber conveying means for removing picked cucumbers from the rearward ends of said troughs.

* * * * *